(12) United States Patent
Kuelbs

(10) Patent No.: US 7,021,787 B1
(45) Date of Patent: *Apr. 4, 2006

(54) OUTDOOR LIGHTING SYSTEM

(75) Inventor: Gregory G. Kuelbs, Westlake, TX (US)

(73) Assignee: World Factory, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/287,335

(22) Filed: Nov. 1, 2002

Related U.S. Application Data

(60) Provisional application No. 60/335,933, filed on Nov. 2, 2001.

(51) Int. Cl.
*A45B 3/04* (2006.01)
*F21V 33/00* (2006.01)

(52) U.S. Cl. ............... 362/183; 362/184; 362/431; 362/276

(58) Field of Classification Search ............... 362/183, 362/249, 184, 431, 410, 414, 102, 276, 802, 362/391
See application file for complete search history.

(56) References Cited

U.S. PATENT DOCUMENTS

| 4,841,416 | A | * | 6/1989 | Doss .......................... 362/183 |
| 5,315,776 | A | * | 5/1994 | Strawbridge et al. ......... 40/505 |
| 5,329,716 | A | * | 7/1994 | Fite ............................ 40/575 |
| 5,367,442 | A | * | 11/1994 | Frost et al. ................. 362/183 |
| 5,564,816 | A | * | 10/1996 | Arcadia et al. ............. 362/183 |
| 5,735,492 | A | * | 4/1998 | Pace .......................... 246/125 |
| 6,406,163 | B1 | * | 6/2002 | Yang .......................... 362/183 |
| 6,612,713 | B1 | * | 9/2003 | Kuelbs ....................... 362/102 |

* cited by examiner

*Primary Examiner*—Thomas M. Sember
(74) *Attorney, Agent, or Firm*—James E. Walton

(57) ABSTRACT

An outdoor lighting system is disclosed. The individual lights are self-powered by one or more batteries carried in the lighting structure itself. In one embodiment, one or more rechargeable batteries are located within a relatively elongated base structure of the lighting component. In one particular embodiment, this elongated base structure also serves as a stake that is utilized to fix the lighting fixture in a particular outdoor location, such as a lawn, pathway, driveway, or patio.

33 Claims, 13 Drawing Sheets

OUTDOOR LIGHTING SYSTEM

This application claims the benefit of U.S. Provisional Application No. 60/335,933, filed 2 Nov. 2001, titled "Outdoor Lighting System with Cold cathode ray tubes."

BACKGROUND

1. Field of the Invention

The present invention relates to outdoor lighting. In particular, the present invention relates to outdoor landscape lighting.

2. Description of Related Art

Outdoor lighting systems have been around for many years. However, low-cost, automated low-voltage lighting systems are a relatively recent introduction into the outdoor lighting market. These low-voltage systems typically include a plurality of lighting fixtures wired together and to a control box. The lighting elements in the lighting fixtures are typically 4-Volt or 11-Volt incandescent bulbs. The control box typically plugs into a conventional AC power outlet and includes the necessary voltage regulators, AC to DC converters, on-off switches, and optional timers.

There are several problems associated with such low-voltage lighting systems. For example, they must be plugged into a conventional AC power outlet to receive power, the incandescent bulbs do not provide high intensity light, and the they cannot be utilized in remote locations away from an AC outlet.

Some outdoor lighting systems utilize individual lighting fixtures having solar cells and rechargeable batteries. These systems typically include a solar cell located on the hood of the lighting fixture, a small rechargeable battery located inside the hood, and a photovoltaic cell to control when the lighting fixture turns on and off. As with the AC systems, the lighting elements in the lighting fixtures are typically 4-Volt or 11-Volt incandescent bulbs.

The are also problems associated with these types of lighting systems. For example, the size and number of the rechargeable batteries is extremely limited, resulting in short periods of illumination, the incandescent bulbs do not provide high intensity light, and the lighting fixtures must operate independently of each other.

SUMMARY OF THE INVENTION

There is a need for an outdoor lighting system having solar powered rechargeable batteries and high intensity lighting elements.

Therefore it is an object of the present invention to provide an outdoor lighting system having solar powered rechargeable batteries and high intensity lighting elements.

Umbrella Systems

It is one objective of the present invention to provide a lawn or patio umbrella with an integral lighting system that utilizes a cold cathode ray tube to provide relatively bright outdoor light for reading and other relatively high light intensity activities.

It is another objective of the present invention to provide an improved umbrella with an integral lighting system having a cold cathode ray tube with its own rechargeable power supply and solar cells.

It is yet another objective of the present invention to provide a lawn or patio umbrella that includes a cold cathode ray tube lighting system and an electrically-actuated motorized retraction subassembly that allows the umbrella to be opened and closed more easily.

Lawn Lighting Systems

The present invention represents a novel combination of elements that make up an attractive and efficient lawn lighting system. The system utilizes cold cathode ray tubes.

It is one objective of the present invention to provide a cold cathode ray tube lawn lighting system in which the individual lights are self-powered by one or more batteries carried in the lighting structure itself. In the preferred embodiment, one or more rechargeable batteries are located within a relatively elongated base structure of the lighting component. In one particular embodiment, this elongated base structure also serves as a stake that is utilized to fix the lighting fixture in a particular location, such as a lawn, pathway, driveway, or patio.

It is another objective of the present invention to provide a photovoltaic solar cell that is utilized to convert sunlight into electrical energy to recharge the rechargeable battery or battery pack carried by the cold cathode ray tube lighting fixture. In one particular embodiment of the present invention, each lighting fixture carries its own solar cell. In another particular embodiment of the present invention, a remotely located solar cell panel is utilized to recharge a plurality of batteries or battery packs contained in a number of light fixtures that are all connected together by electrical conductors. This remotely located photovoltaic solar cell panel may provide the sole means for recharging the battery packs, or it may supplement charging performed by photovoltaic solar cells carried on each individual lighting fixture.

Cold Cathode Ray Tubes for Outdoor Lighting

It is another objective of the present invention to utilize a cold cathode ray tube as the primary bulb for an outdoor lighting fixture that is independent of any household electrical systems. The cold cathode ray tube is a relatively low power consuming device, does not generate much heat, provides a high amount of light intensity output from the bulb, reduces the overall energy consumption of the outdoor lighting fixture, allows for fewer batteries to be utilized in each lighting fixture, allows for easier recharging of the batteries due to the lower power requirements, and allows the utilization of smaller photovoltaic solar cells. One additional advantage of utilizing a cold cathode ray tube is that it may be operated at multiple voltage levels to provide differing amounts of light output. In one particular embodiment, a wireless receiver and transmitter pair may be utilized to allow an operator to use a wireless command signal to change the operating state of a lawn lighting system, and in particular may be utilized to switch the system between on and off conditions, and to switch the system between varying levels of light output. Accordingly, an operator may intensify the light output from a lawn lighting system through use of a wireless handheld transmitter if he needs additional light at a particular location, such as a particular pathway, patio, lawn, or other outdoor structure or feature.

BRIEF DESCRIPTION OF THE DRAWINGS

The novel features believed characteristic of the invention are set forth in the appended claims. The invention itself however, as well as a preferred mode of use, and further objectives and advantages thereof, will best be understood by reference to the following detailed description of the preferred embodiment when read in conjunction with the accompanying drawings, wherein:

Umbrella Systems

Lawn Lighting Systems

Figure 10:
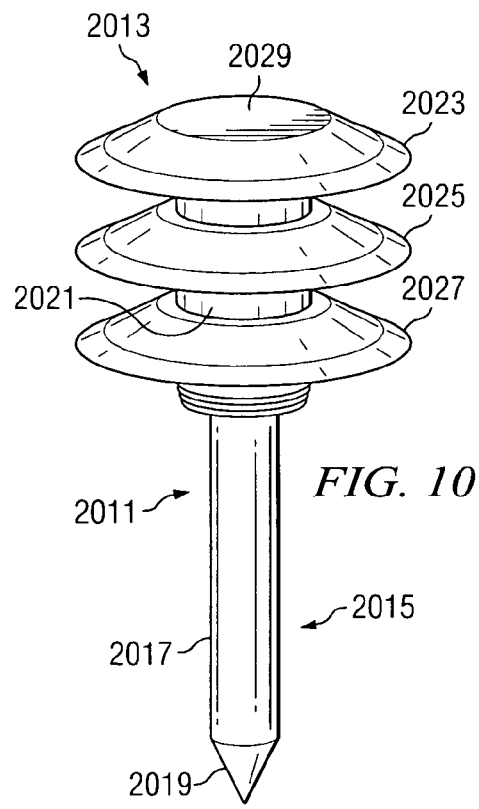

FIG. 10 is a view of one embodiment of an outdoor lighting system in accordance with the present invention.

Figure 11:
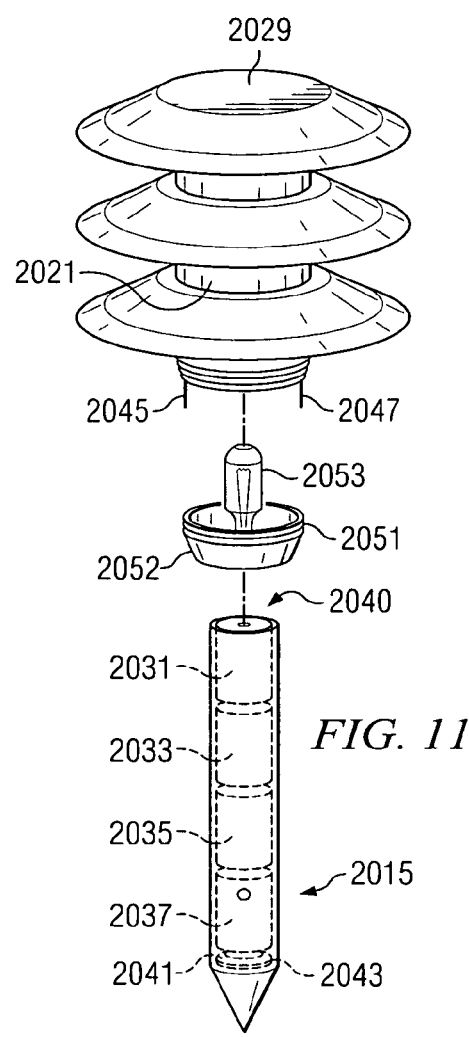

FIG. 11 is a view of a lighting system of FIG. 10 in exploded format.

Figure 12:
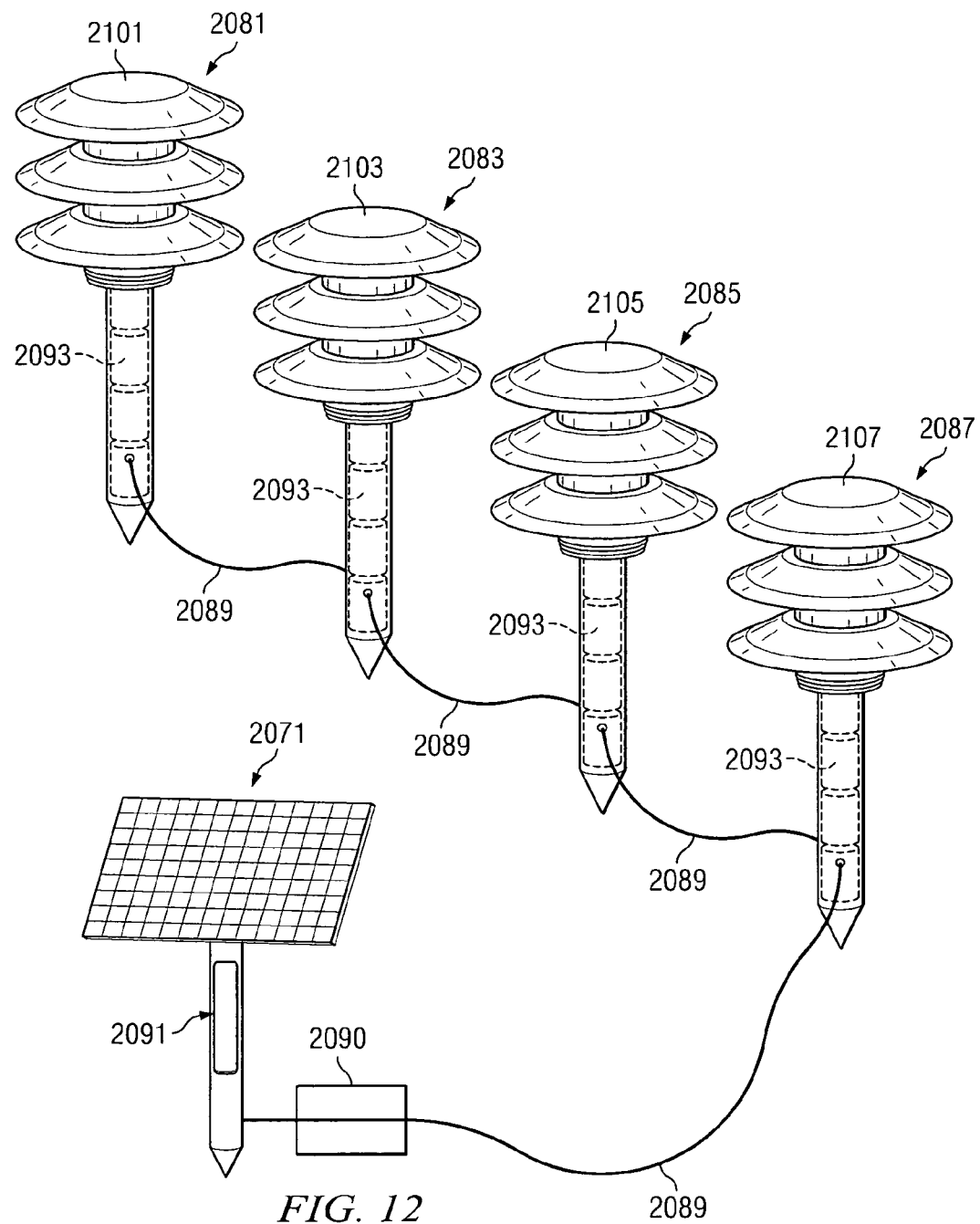

FIG. 12 depicts an alternative embodiment of the outdoor lighting system of the present invention in which a relatively large solar cell station is utilized to charge a plurality of individual lights.

Cold Cathode Ray Tube Outdoor Lighting

Figure 13:
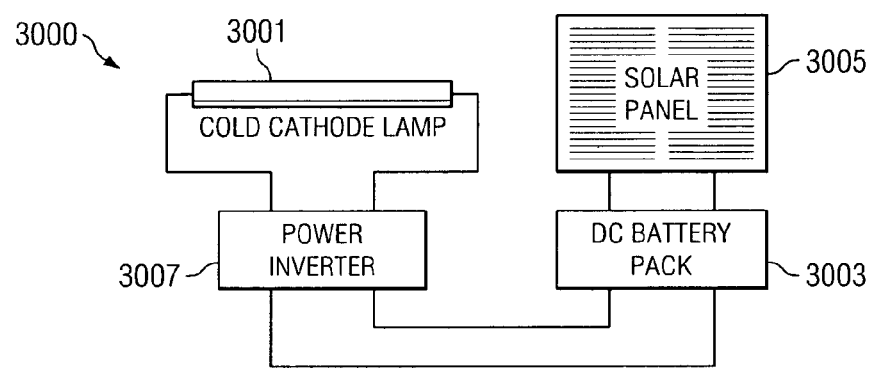

FIG. 13 is a simplified electrical schematic depicting one preferred outdoor lighting system in accordance with the present invention.

Figure 14:
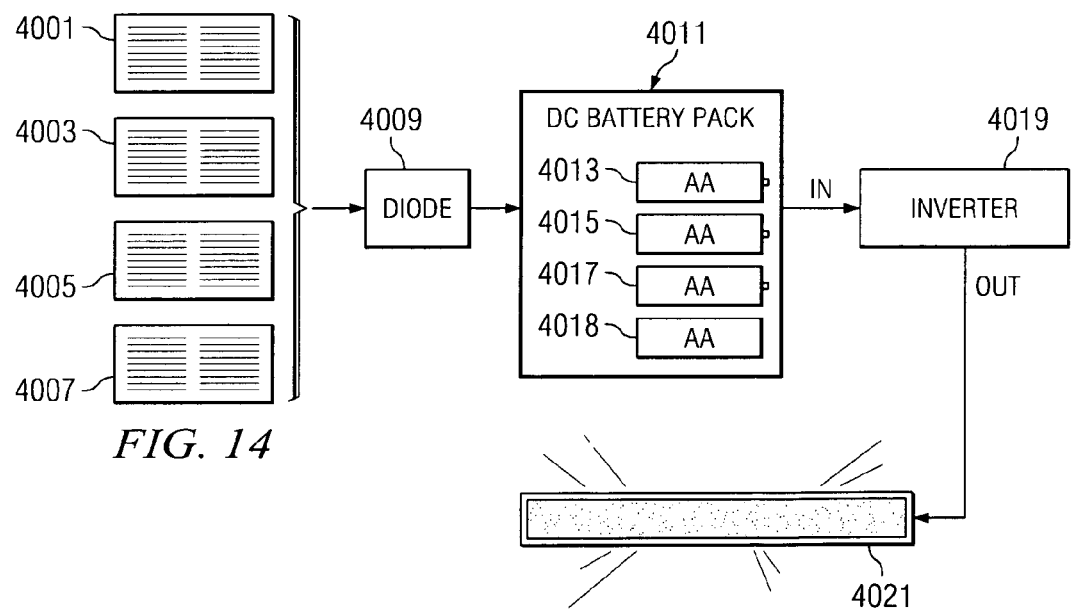

FIG. 14 depicts a cold cathode ray tube that is utilized in all embodiments of the present invention.

DETAILED DESCRIPTION OF THE PREFERRED EMBODIMENT

Umbrella Lighting Systems

Figure 1:
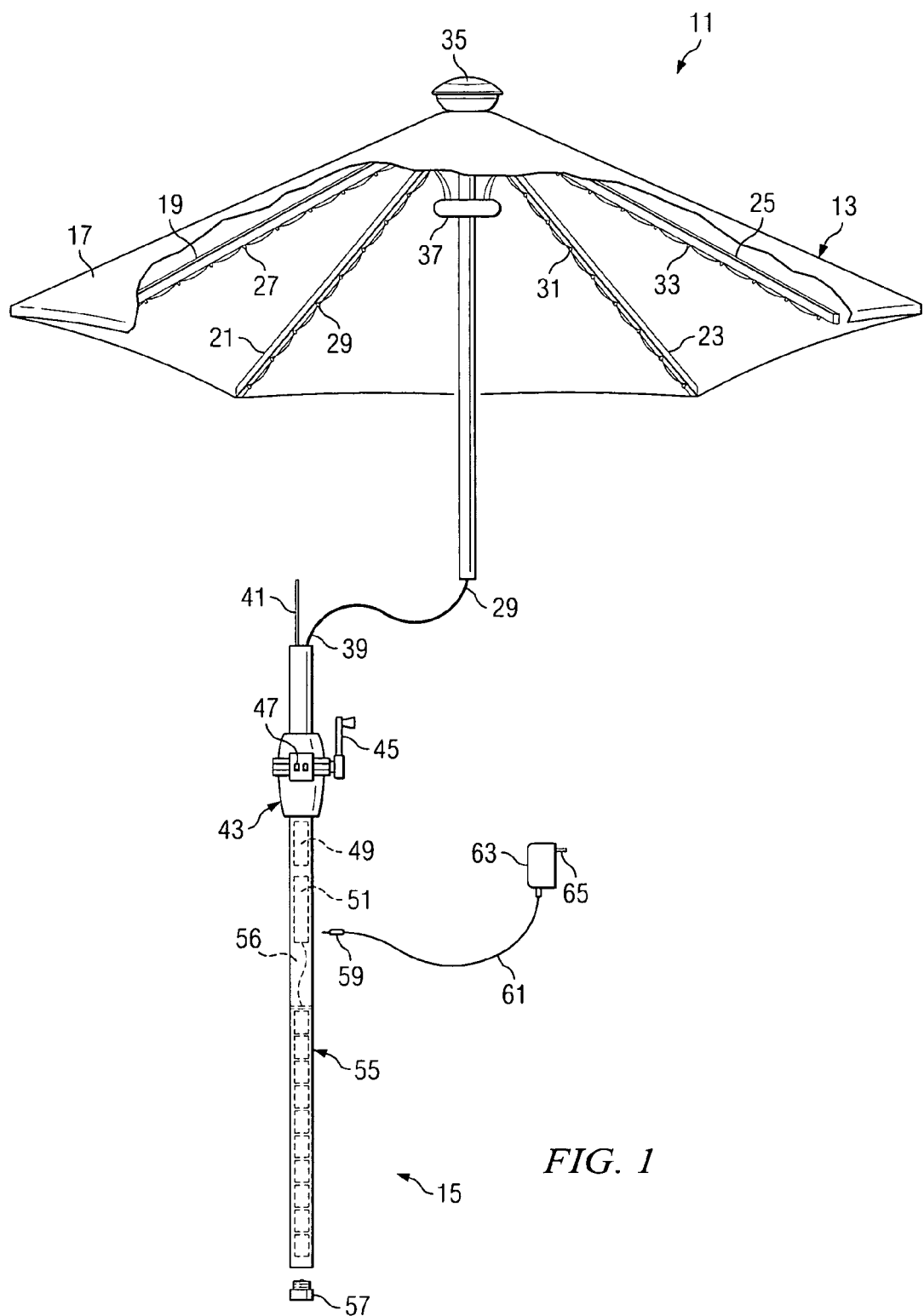
FIG. 1 is a fragmentary and sectional view of a first embodiment of an improved lighted umbrella with motorized retraction assembly in accordance with the present invention.

FIG. 1 is a view of a first embodiment of the present invention. It is directed to an improved umbrella 11 which includes an integral lighted system and a motorized retraction system which allows one to open and close the umbrella canopy through the push of a button. Preferably, the lighting system utilizes a cold cathode ray tube which will be described in greater detail below. As is shown in FIG. 1, improved umbrella 11 includes an umbrella portion 13 and a pole portion 15. The view of FIG. 1 does not include the view of a base member which is typical or conventional for use with umbrellas. The other embodiments show a variety of conventional and novel base members, any of which can be utilized with the embodiment of FIG. 1. Alternatively, the embodiment of FIG. 1 (as well as the other embodiments) can be utilized with little or no base member whatsoever provided that there is a table with a center aperture adapted in size and shape to receive the pole portion 15 of the improved umbrella 11. In other words, some patio or lawn furniture includes umbrella ports which allow the furniture itself to stabilize the umbrella and there is little or no need for a base member.

As is shown, the improved umbrella 11 includes a canopy 17 which is in a fully opened condition. The umbrella is retractable and may be moved between the open position which is shown and a closed position which is not shown but which is conventional and can be easily imagined. The canopy 17 is supported by a number of ribs, including ribs 19, 21, 23, and 25. In accordance with the preferred embodiment of the present invention, a plurality of light strands 27, 29, 31, and 33 are attached to the ribs 19, 21, 23, 25. Each of the light strands includes an electrical wiring and a number of small cold cathode ray tube light bulbs which provide illumination under the umbrella canopy 17 and which light the table and surrounding area underneath the open umbrella canopy 17. A wiring ring 37 is provided which secures and locates the wires that are carried through the hollow center portion of the pole portion 15. As is shown in FIG. 1, electrical wires 39 are located within the hollow center portion of pole portion 15. Additionally, a cable system 41 is provide within the hollow center portion of pole portion 15 in order to allow the opening and closing of the umbrella canopy 17. Cable system 41 is connected to a pulley system 43 that is contained within a housing in an intermediate portion of the pole portion 15. Preferably, there is a crank 45 that is adapted to turn a conventional gear assembly that operates pulley system 43 and allows the canopy 17 to be moved between open and closed conditions.

It is one objective of the present invention to provide an alternative electrical and motorized retraction system for use with the lighted umbrella 11. In accordance with this embodiment, an electrical screw driver motor 49, or other similar relatively small diameter motor assembly, is located within the hollow central portion of pole portion 15 operably associated with the pulley assembly 43. Preferably, the gear assembly allows the electrical screw driver motor 49 to operate pulley 43 and open and close the canopy 17 of the improved umbrella 11. Preferably, a switch 47 is provided which is accessible from the exterior of the pole portion 15 in order to allow the operator to open and close the umbrella canopy 17 with a single touch of a button. In the lower extremities of pole portion 15, a plurality of rechargeable batteries 55 are provided in an elongated cavity 56. These batteries 55 are utilized to provide electrical energy for operation of the electrical screw driver motor 49 as well as the light strands 27, 29, 31, and 33 that are carried within the canopy 17. Preferably, a charger 51 is utilized to charge the batteries 55. As is shown in FIG. 1, an optional external charger adapter 63 may be provided, which includes a relatively small plug 59 and a wire 61. External charger adapter 63 is adapted with a plug 65, which allows batteries 55 to be recharged from a conventional AC wall outlet.

In accordance with a preferred embodiment of the present invention, an alternative charging system may be provided through a solar cell 35 that is carried at an upper cap portion of umbrella 11. This solar cell 35 is electrically connected through wires 29 carried through the central bore of the pole portion 15. These wires interconnect with the charging circuit and allow for a small trickle charge to be applied to the rechargeable batteries 55 as long as sunlight falls upon solar cell 35. In this manner, the amount and frequency of charging through external charger adapter 63 may be minimized, because solar cell 35 provides a continuous recharging through the daylight hours. As is shown in FIG. 1, an end cap 57 with an integral ground connector is provided at the lowermost portion of the pole portion 15.

The embodiment depicted in FIG. 1 is advantageous over the prior art in that it provides a number of useful functions. The umbrella is lighted by a lighting system that does not require continuous access to an AC wall outlet, and the use of cold cathode ray tubes ensures a high intensity light. This allows the umbrella to be placed in a relatively remote lawn or garden locations which may be away from, or substantially removed from, electrical power from any AC wall outlet. The solar cell 33 provides, during daylight hours, a continuous trickle charge to rechargeable batteries 55, thus reducing the need and frequency of connection to an AC wall outlet. When a charge is needed, the external charger adapter 63 may be utilized to directly charge batteries 55 through charger 51. A conventional extension cord may be employed to allow access to remotely located umbrellas.

Figure 2A:
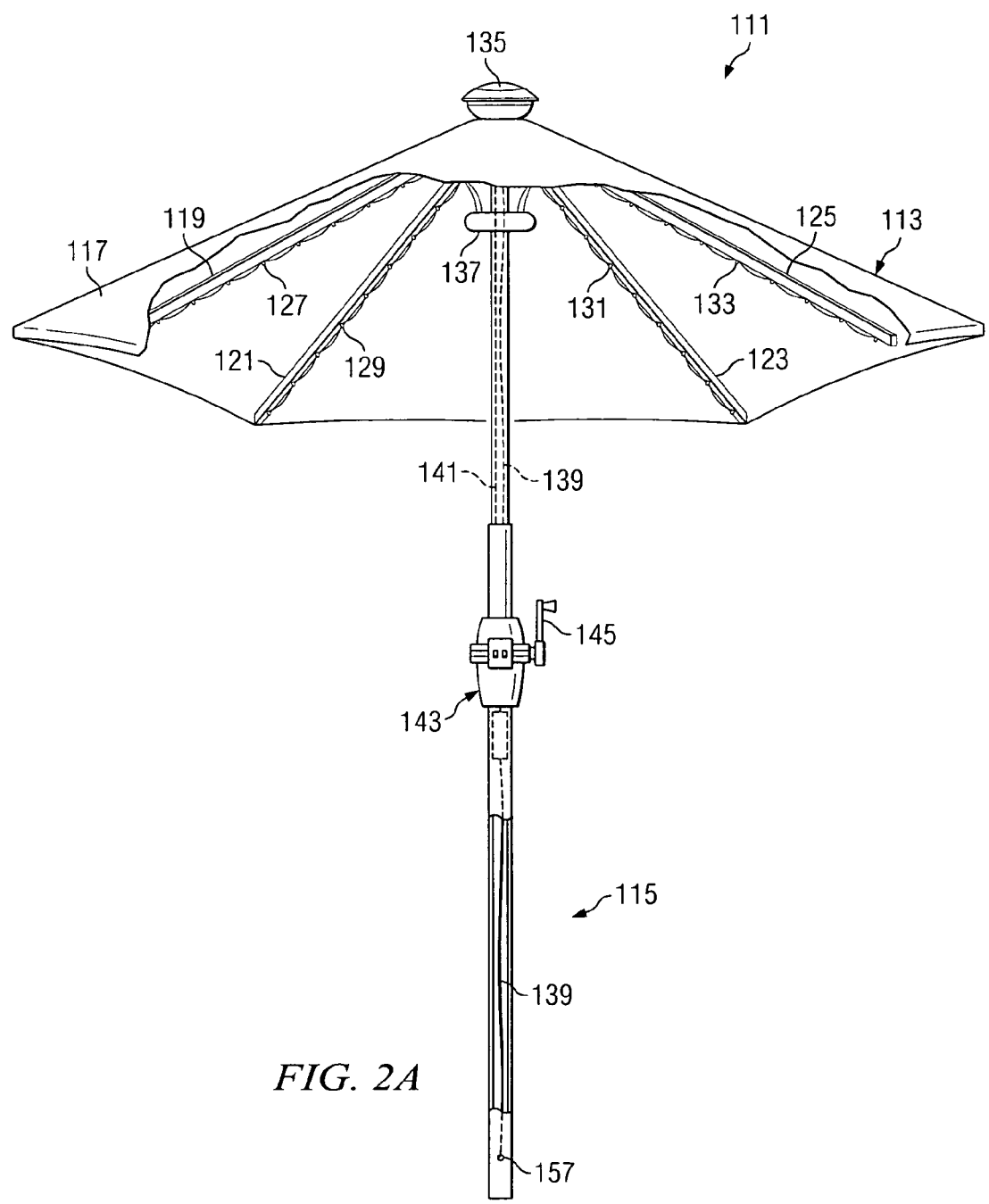
FIGS. 2A, 2B, and 2C are pictorial, fragmentary, and section views of a second embodiment of the present invention which comprises a lighted umbrella with a stand and a single battery and removable base cover.
Figure 2B:
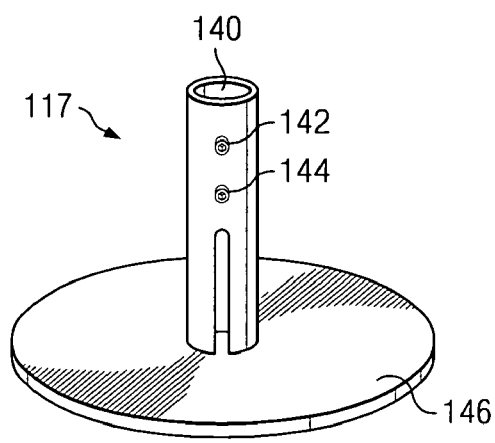
Figure 2C:
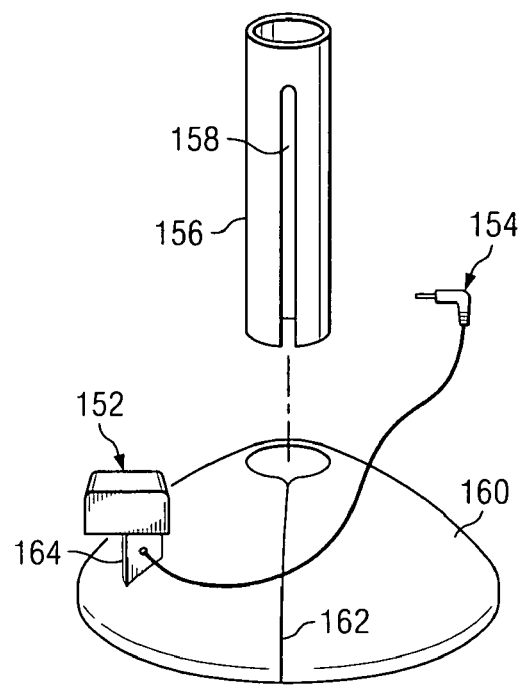

FIGS. 2A–2C depict a second embodiment of the present invention, which is a lighted umbrella stand that includes a rechargeable battery 152, preferably a single 18-Volt rechargeable battery, and removable battery cover. This embodiment may include or exclude the motorized retraction system; however, it may or may not be included based upon the manufacturer or the end user's desires. In order to simplify the drawing, the motorized retraction system which is shown in FIG. 1 of the first embodiment has not been shown in the view of FIG. 2A of the second embodiment. As is shown, an improved umbrella 111 includes an umbrella portion 113 and a pole portion 115. Umbrella 111 includes a canopy 117 that may be opened and closed. A plurality of ribs 119, 121, 123, and 125 are located on the underside portion of canopy 117. Light strands 127, 129, 131, and 133 are secured to the ribs 119, 121, 123, and 125. The light strands 127, 129, 131, and 133 represent a string of relatively small cold cathode ray tube lights and the associated conductors. A wiring ring 137 is provided in a central location in order to allow the routing of wiring 139 to the hollow central portion of the stand portion 115. Like the embodiment of FIG. 1, the hollow central portion of the stand portion 115 is adapted to carry the wiring 139 as well as a cable system 141. Cable system 141 allows a pulley assembly 143 and a crank 145 to open and close the umbrella 111, either manually or automatically if a motorized retraction system is included.

Like the first embodiment, a solar cell 135 is carried at a cap portion of the improved umbrella 111. Solar cell 135 is adapted to supply a trickle charge to the battery which is utilized to energize the light strands 127, 129, 131, and 133 during use. As is shown, the wire 139 from the solar cell 135 is carried downward through stand portion 115. A connector 158 is provided to allow a charger to be electrically coupled to the umbrella stand 111.

FIG. 2B depicts a conventional stand member for use with freestanding umbrellas. As is shown, a base 117 is provided with a central aperture 140 that is adapted to receive the stand portion 115 of improved umbrella 111 of FIG. 2A. Two screw clamps 142 and 144 are provided in order to secure the stand portion 115 within the aperture 140. A flat bottom weight 146 is provided in order to stabilize the improved umbrella 111.

FIG. 2C depicts additional components that may be utilized in combination with the base 117 of FIG. 2B in order to allow the placement and use of a rechargeable battery 152. As is shown, a removable cylindrical cover 156 is provided which includes a longitudinal slot 158 that is adapted to receive the screw clamps 142 and 144 of FIG. 2B. Cover 156 is a removable component that slides over the upper portion of base 117 of FIG. 2B. A lower removable cover 160 is also provided. Removable cover 160 may include one or more seams 162 which allow the lower removable cover 160 to be taken apart and put back together. In other words, the lower removable cover 160 is separated into at least two parts in order to allow it to be placed over base 117 of FIG. 2B. Cover 160 includes a contoured portion 164 that is adapted to receive 18-Volt rechargeable battery 152. This 18-Volt rechargeable battery 152 is preferably the type of battery that is utilized with most modern cordless power tools, such as drills, saws, and sanders. This allows a consumer to utilize rechargeable battery packs from cordless power tools that he may already have. The rechargeable battery pack 152 is electrically coupled to a connector 154 that allows connection to a connector 157 of wires 139. This allows an electrical circuit to be formed between the rechargeable battery pack 152 and the light strands 127, 129, 131, and 133 of improved umbrella 111.

This embodiment is advantageous over the state of the prior art in that it utilizes a solar cell to provide a trickle charge for rechargeable battery 152 during daylight hours. Additionally, it is advantageous over the prior art in that it utilizes preexisting rechargeable battery packs that are commonly used with cordless electrically actuated hand power tools, such as screw drivers and drills. A consumer may have multiple battery packs in his possession. If a battery pack is discharged to the point where it cannot actuate the lights contained in the light strands 127, 129, 131, and 133 the consumer may replace it with another rechargeable battery 152 for placement in the lower removable cover 160 for electrical connection to the light strands 127, 129, 131, and 133. In other words, the lighting system of the umbrella may be energized conveniently even though the umbrella may be located extremely remotely from an AC wall outlet, such as in a garden patio, or on a boat dock. When the battery pack 152 has discharged, the user need only replace it with a fully charged battery pack. Thus, there is no need to use extension cords to charge the battery associated with the umbrella stand 111.

Figure 3A:
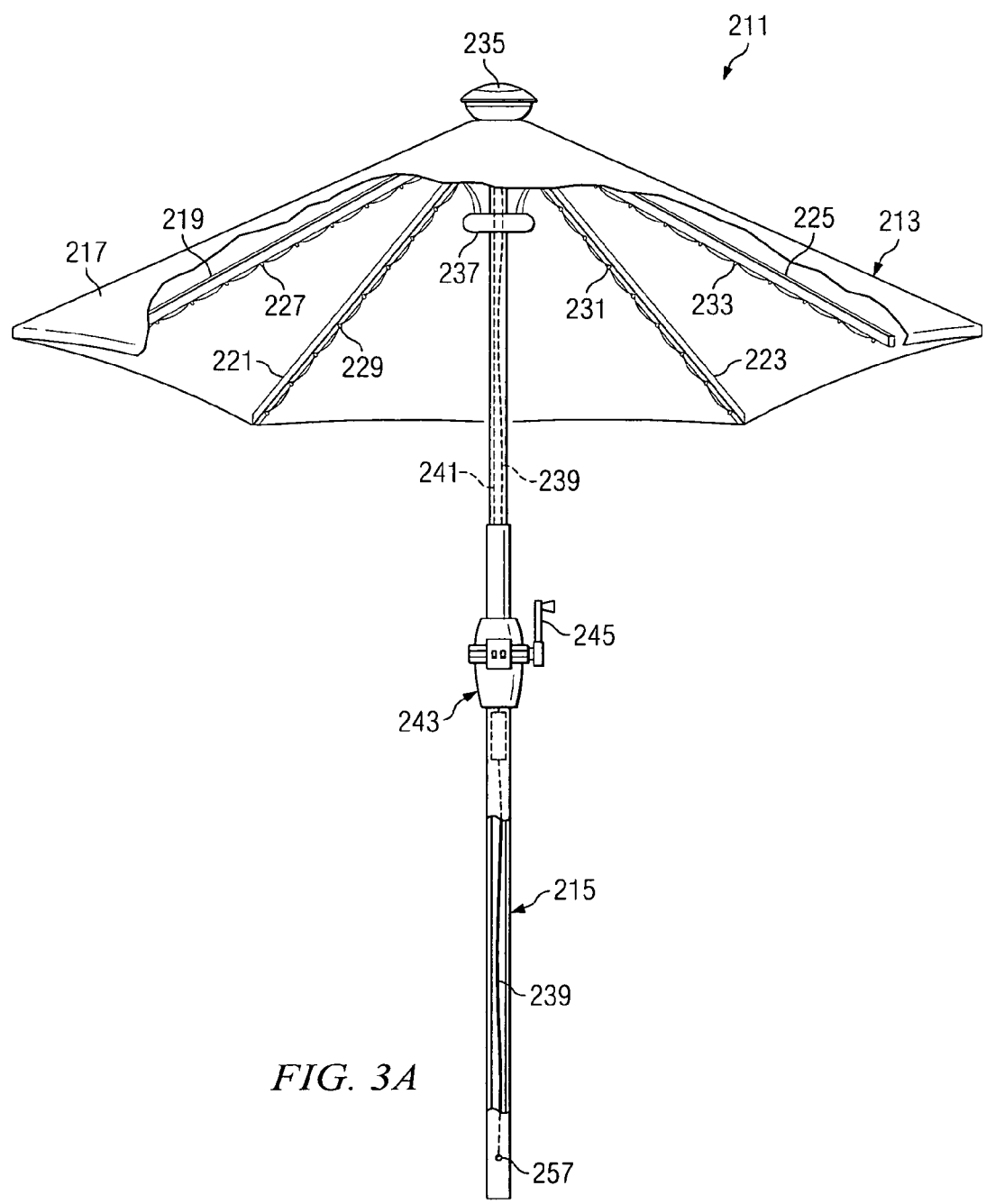
FIGS. 3A, 3B, and 3C are pictorial, fragmentary, and partial section views of a third embodiment of the present invention which is directed to a lighted umbrella with a stand, charger, batteries, and removable battery cover.
Figure 3B:
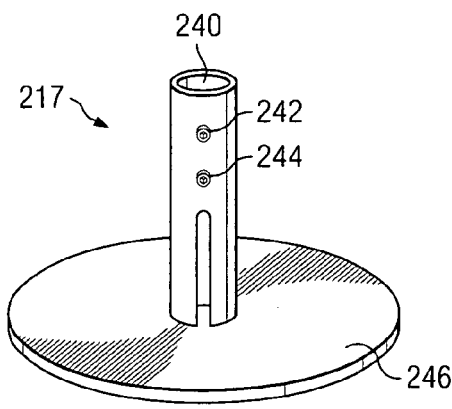
Figure 3C:
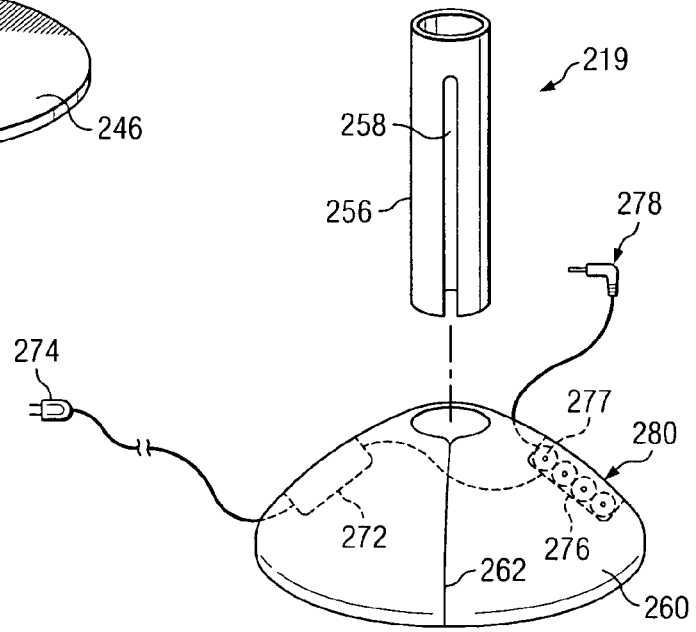

FIGS. 3A, 3B, and 3C depict a third embodiment of the present invention. This embodiment is directed to a lighted umbrella with a stand, charger, and rechargeable batteries. It utilizes a removable cover similar to the second embodiment of FIGS. 2A–2C.

As is shown in FIG. 3A, an improved umbrella 211 includes an umbrella portion 213 and a pole portion 215.

Umbrella 211 includes a canopy 217 that can be opened and closed. Umbrella 211 further includes a plurality of ribs 219, 221, 223, and 225 that carry a number of light strands 227, 229, 231, and 233. Light strands 227, 229, 231, and 233 each contain a number of small cold cathode ray tube bulbs and associated wiring. A solar cell 235 is carried at upper cap portion of the improved umbrella 211. Solar cell 235 is provided to provide a trickle charge to rechargeable batteries 277 associated with the lighted umbrella. As is shown, a wiring ring 237 is provided to route wiring 239 into the hollow central portion of the stand portion 215. As in the previous embodiments, a cable system 241 is also routed through the hollow central portion of stand portion 215 and is utilized to open and close the umbrella canopy 217. A pulley system 243 and a crank 245 are provided to allow the manual opening and closing of the umbrella 211. Alternatively, the third embodiment may be equipped with a motorized retraction system that allows the umbrella canopy 217 to be opened and closed with a single touch of a button. For purposes of clarity, the motorized retraction system is not shown in the view of FIG. 3A.

FIG. 3B depicts a conventional base member 217 that includes a center aperture 240 that is adapted to receive the stand portion 215. Base 217 additionally includes screw clamps 242 and 244 that are adapted to secure the stand portion 215 in place within the aperture 240. A weighted bottom portion 246 is provided to stabilize and anchor the umbrella 211 in place.

FIG. 3C depicts removable components that are placed over the base 217 of FIG. 3B in order to house the electrical components that power the lights carried by the light strands 227, 229, 231, and 233 of improved umbrella 211. As is shown, an upper removable cover 256 is provided that includes a longitudinal slot 258 that is adapted to receive the screw clamps 242 and 244. A lower removable cover 260 is provided for placement over the bottom weight 246. Cover 260 is formed in several segments that can be coupled and decoupled, or a seam is provided, such as seam 262 that allows cover 260 to be placed over base 246. Lower removable cover 260 includes a rechargeable battery box 280 located within a recessed portion 276 of lower removable cover 260 for holding rechargeable batteries 277. Additionally, a charger 272 is also located within lower removable cover 260 in an appropriately shaped and sized cavity. The batteries 277 are coupled to a connector 278 that connects to a connector 257 at the terminal end of wires 239. Charger 272 includes a plug 274 to allow connection to a conventional AC wall outlet for optional charging of rechargeable batteries 277.

Figure 4A:
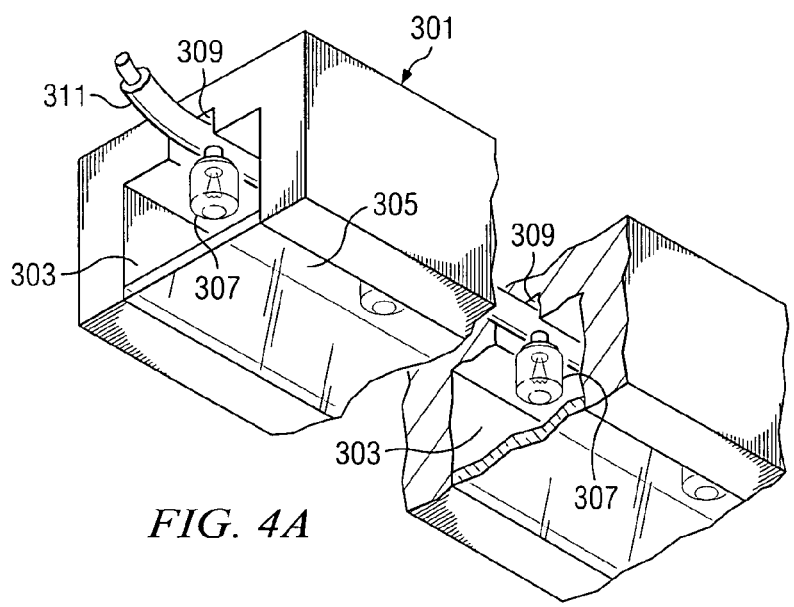
FIG. 4A is a fragmentary and sectional view of the fourth embodiment which is directed to an improved lighted umbrella with recessed lighting.

FIG. 4A depicts a fourth embodiment in which the lighting elements are recessed into a rib member, such as rib member 301. FIG. 4A is a fragmentary and sectional view of a rib 301. As is shown, a cavity 303 is formed within rib 301 and adapted to receive and hold light bulb 307. A translucent material 305 is provided to cover the cavity 303 and an array of bulbs 307 is maintained within the cavity 303 along the length of rib 301. According to the preferred embodiment, bulb 307 is a cold cathode ray tube bulb. In practice, there may be many bulbs 307 extending along the length of rib 301 to illuminate the area under the umbrella. As is shown, a wiring cavity 309 is provided which joins the cavity 303. Wiring 311 is passed through this wiring cavity 309 and provides a circuit for the plurality of bulbs 307 carried by rib 301. The translucent material extends along the entire length of the cavity 303 of rib 301. The result is a recessed lighting that is carried entirely within the ribs 301 and that is not otherwise exposed to the elements.

Figure 4B:
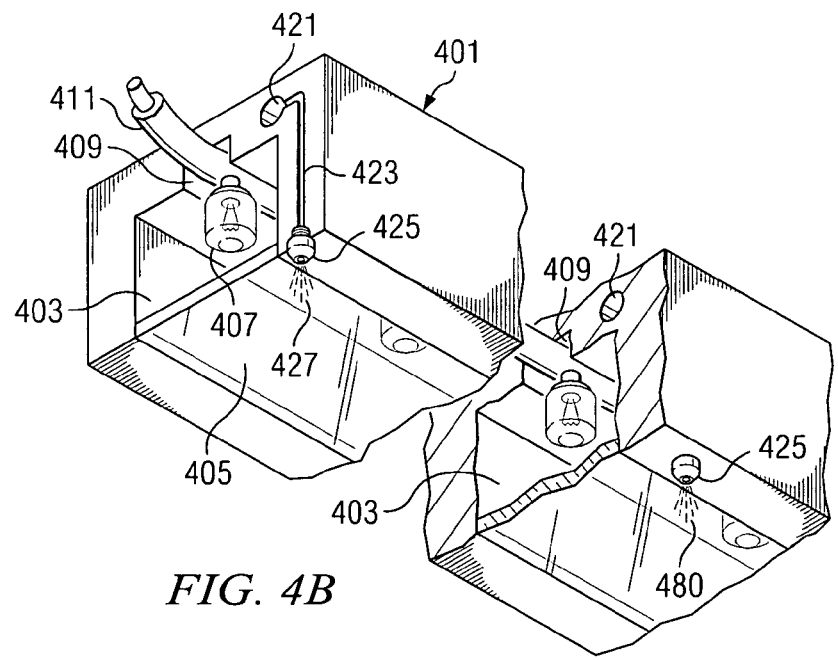
FIG. 4B is directed to a fifth embodiment of the present invention which is directed to an improved lighted umbrella with integral misting system.

FIG. 4B illustrates a fifth embodiment. This embodiment combines the recessed lighting embodiment of FIG. 4A with an integral misting function. The misting function provides a light mist to cool the area under the umbrella. As is shown, a rib 401 includes a channel 403 that is adapted to house a number of bulbs 407 that extend at predetermined spacing along the length of rib 401. A wiring cavity 409 joins channel 403 and is adapted to carry the wiring that provides the circuit for the bulbs 407. A translucent material 405 is provided to cover channel 403 and allow for illumination through the translucent material 405. As is also shown, a second fluid channel 421 is provided in order to receive a fluid-tight hose which supplies water to a misting nozzle 425 which generates mist 427 and 480. A second channel 423 is provided to carry a conductor which leads water to misting nozzle 425. The umbrella should carry in its base or stand portion a small reservoir of water and an electrically-actuated pump which supplies pressurized water through the tubing to the plurality of misting nozzles 425 that are carried at predetermined locations along the length of each of the ribs 401 of the umbrella. In this manner, the umbrella provides both light and a cooling mist to the users.

Figure 4C:
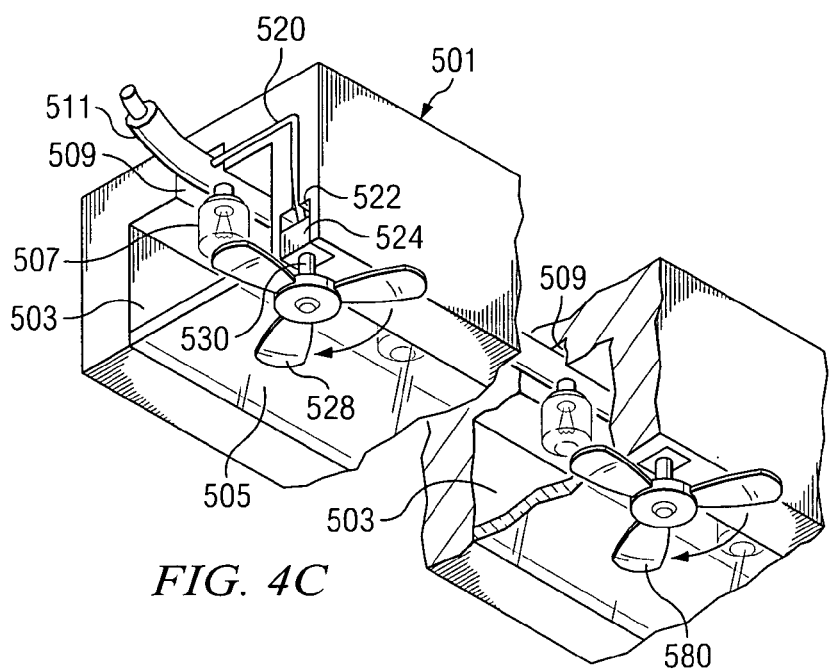
FIG. 4C is directed to a sixth embodiment of the present invention which is directed to an improved lighted umbrella with an integral fan system.

FIG. 4C provides an illustration of a sixth embodiment that combines a lighting function with a fan function. As is shown, a rib 501 is shown in fragmentary and section view. A channel 503 is formed in the rib and is enclosed by translucent material 505. A plurality of bulbs such as bulb 507 are carried within the channel 503. A wiring channel 509 adjoins the channel 503 and is adapted in order to carry the electrical conductors which provide the circuit for the plurality of bulbs, such as cold cathode ray tube bulb 507, which are carried at a predetermined spacing throughout the length of rib 501. A wiring conduit 520 is provided which routes electrical wiring to an electrical motor 524 carried in cavity 522 which is recessed. Fan blades 528 are carried by a rotating shaft 530 that is connected to the motor 524. When energized, the motor 524 rotates the fan blades 528 and provides a cooling breeze under the umbrella. A plurality of fan blade sets 580 may be located at predetermined locations along the length of rib 501.

Figure 5A:
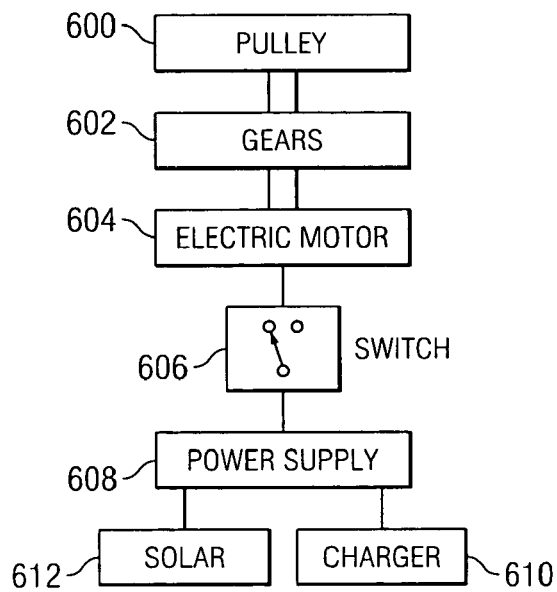
FIG. 5A is a block diagram representation of the motorized retraction system of the first embodiment of FIG. 1.

FIG. 5A is a block diagram representation of the mechanical components necessary for a motorized retraction system. As is shown, a pulley system 600 is coupled through gears 602 to an electric motor 604. A switch 606 is electrically connected between a power supply 608 and electric motor 604. Charger unit 610 and solar charger 612 are coupled to power supply 608 in order to recharge its rechargeable battery elements. Mechanical actuation of switch 606 causes the application of power from power supply 608 to electric motor 604 which works through gear 602 to operate pulley 600. A solar cell 612 provides a trickle charge to recharge the preferably rechargeable batteries of power supply 608. An optional external charger 610 may also be used to recharge the power supply 608. Thus, the switch 606 provides for opening and closing of the umbrella canopy.

Figure 5B:
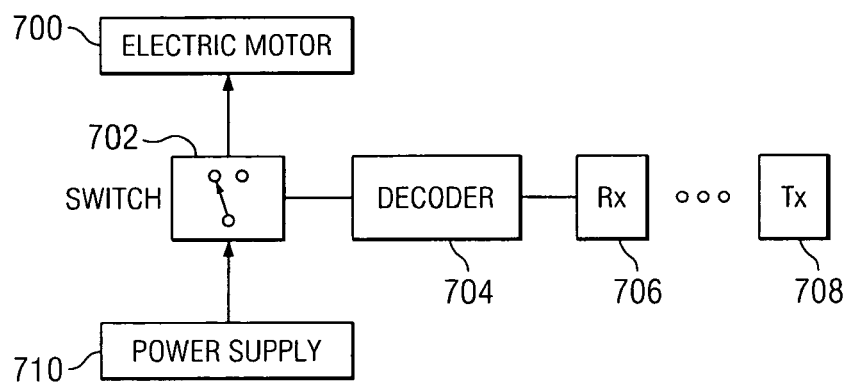
FIG. 5B is a block diagram representation of a seventh embodiment which is an alternative to the motorized retraction system of FIG. 5A.

FIG. 5B represents a seventh embodiment that relates to the motorized retraction feature discussed above in FIG. 5A. In this embodiment, a wireless transmitter 708 is utilized to remotely communicate with wireless receiver 706 that is carried by the umbrella, preferably in the region of the umbrella stand portion or the pulley housing. A decoder 704 is provided in order to decode the received message. As is conventional with garage door openers, the transmitter and receiver pairs 708 and 706 may be adapted to be coded on a particular frequency or coding scheme that enable a dedicated transmitter to actuate a particular receiver. The decoder 704 serves to allow for such identification. The decoder 704 is coupled to electrical switch 702. Switch 702 controls the application of electrical energy from power supply 710 to electric motor 700. In this manner, a motorized retraction system may be actuated remotely utilizing the wireless transmitter.

Figure 6:
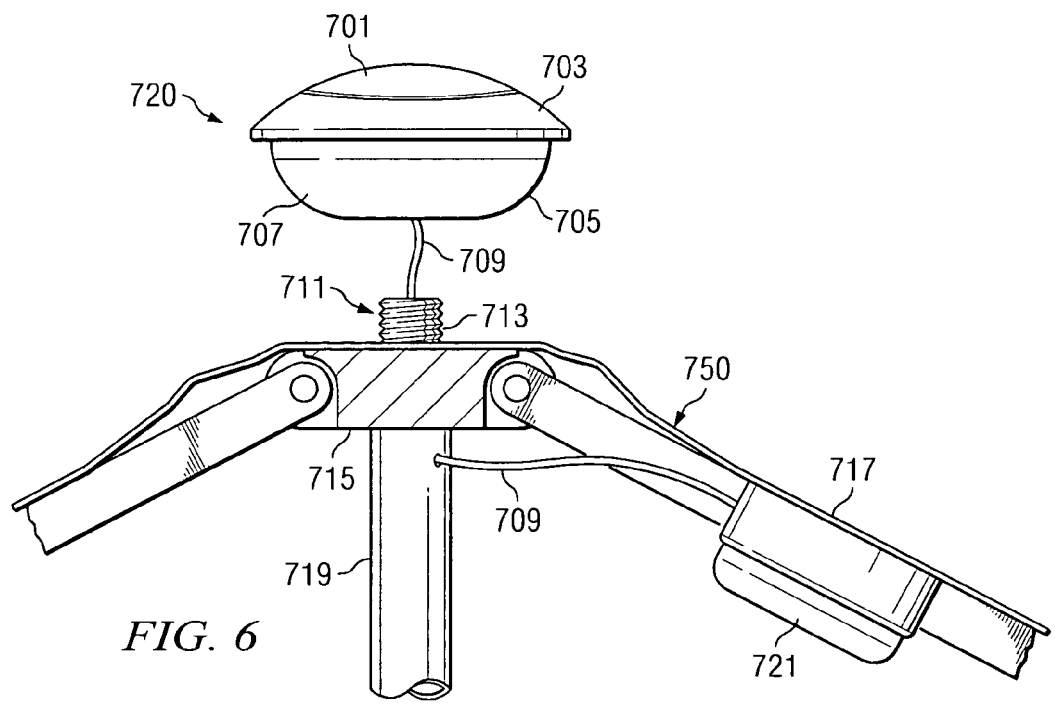
FIG. 6 is a simplified rendering of an alternative embodiment of an umbrella with a power unit and a cold cathode ray tube lighting system.
Figure 7:
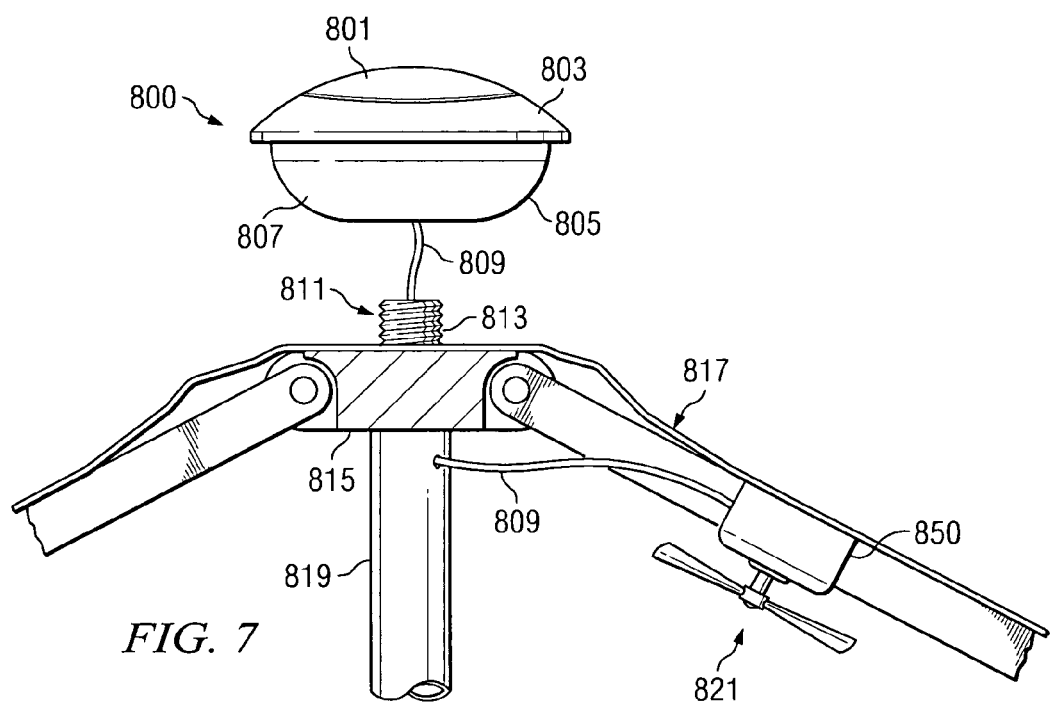
FIG. 7 is a simplified view of an alternative embodiment of an umbrella which includes a power unit and a fan assembly.
Figure 8:
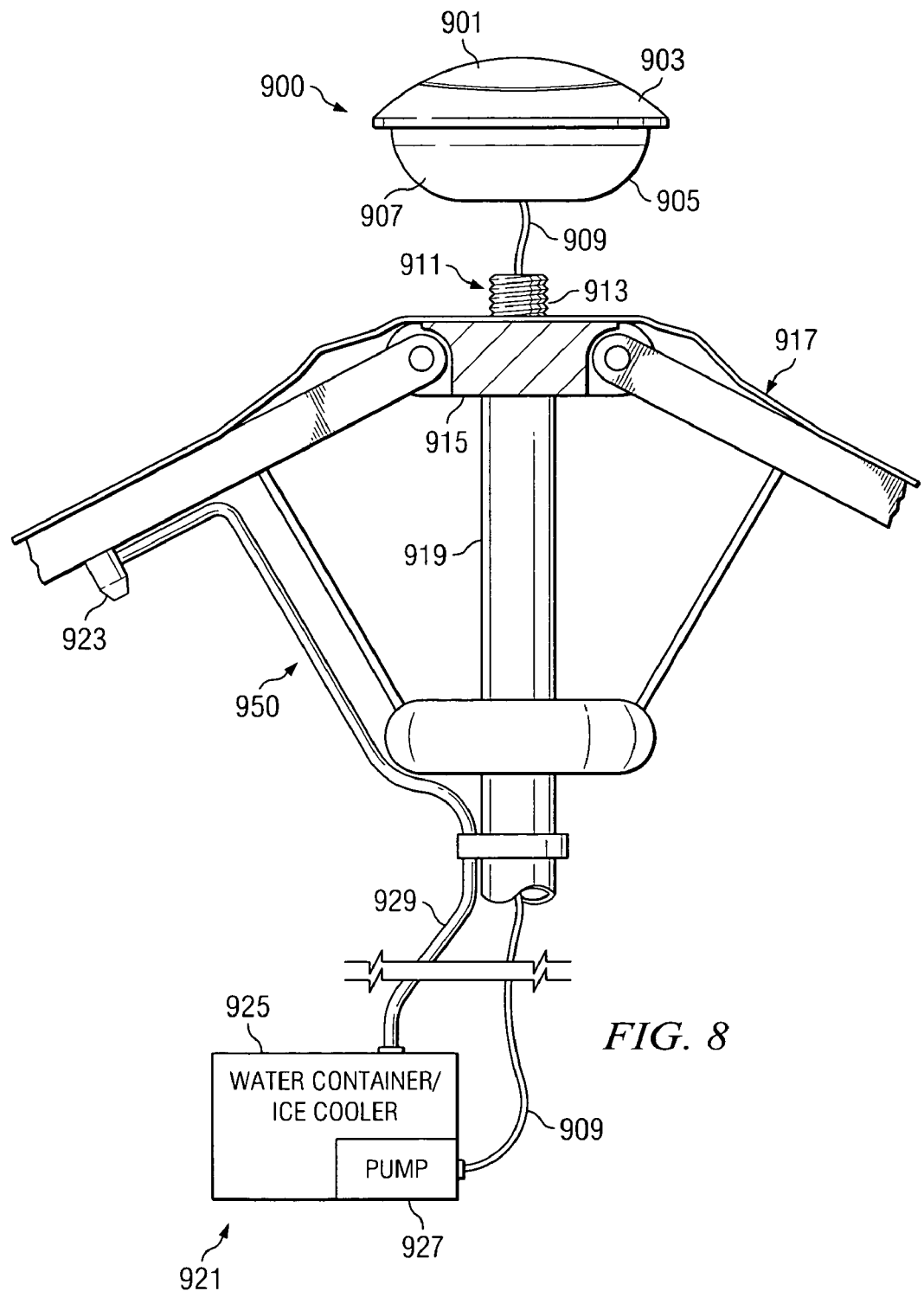
FIG. 8 is a simplified view of an alternative embodiment of an umbrella system with a power unit and a misting system.
Figure 9:
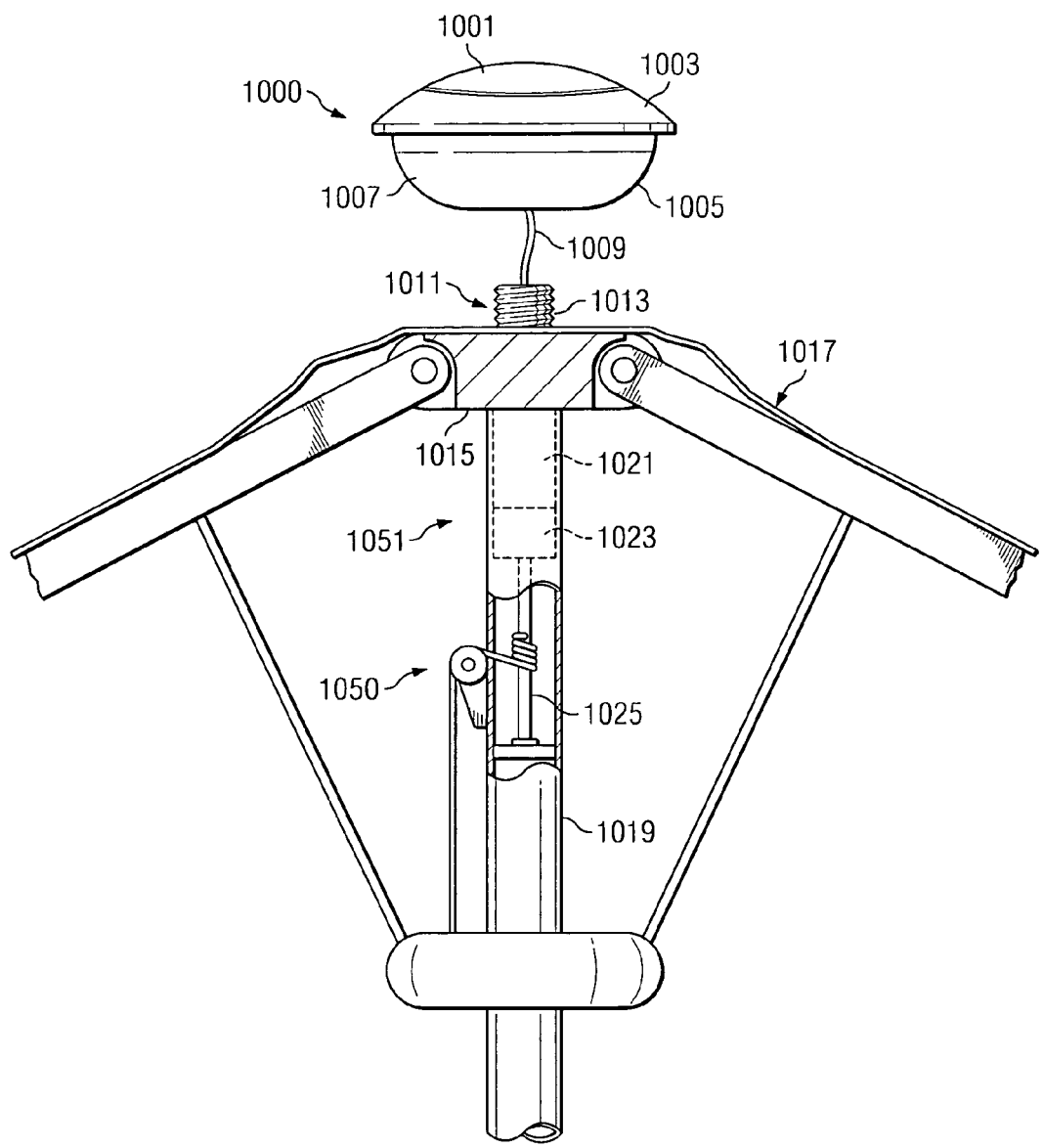
FIG. 9 is an alternative view of an umbrella with a power unit and an automated opening and closing system.

FIGS. 6–9 depict other alternative embodiments of the improved umbrella of the present invention. FIG. 6 depicts an umbrella with a "power unit" and a cold cathode ray tube lighting system. FIG. 7 depicts a power unit with a fan assembly. FIG. 8 depicts a power unit with a misting assembly. FIG. 9 depicts a power unit with an automated umbrella opening and closing system. While FIGS. 6–9 depict a power plant with a single electrical system, in alternative embodiments one could mix and match these electrical subassemblies so that a single power unit provides electrical power to two or more subassemblies. For example, an umbrella may include a lighting system and a fan system. Alternatively, an umbrella may include a lighting system and a misting system. In other words, in alternative embodiments, one could mix and match these components to provide selected subsystems for the umbrella.

One concept which runs throughout the embodiments depicted in FIGS. 6–9 is the utilization of a "power unit." This concept is the placement of a unitary structure at a defined location relative to the umbrella. For example, in the embodiments of FIGS. 6–9, the power unit is shown at a top location directly above the umbrella, and secured to the umbrella mast at a threaded coupling. This "modularity" in the approach allows one to manufacture and sell aftermarket kits which can be installed by the umbrella owners. The kits may include a power unit and one or more of the amenity subsystems such as a lighting system and/or fan system and/or a misting system and/or an automated opening and closing system. Additionally, the kit can include a power unit and two or more of the subsystems. Since the power unit is relatively self-contained, little interaction is required to attach the power unit to an umbrella system.

Alternatively, this modularity in design also facilitates the mass manufacture of umbrellas, allowing the electrical system to be manufactured by one factory, and the umbrella systems which do not include electrical systems to be manufactured by another, different factory, the parts to be brought together in an assembly area and assembled together.

With reference now to FIG. 6, an umbrella unit is shown. As is shown, a power unit 720 is provided for connection to the uppermost portion of an umbrella to power an electrical subassembly 750, while a cold cathode ray tube light subassembly 721 is provided for coupling at a different location relative to the umbrella. As is shown, power unit 720 includes a solar panel 701 at its uppermost portion. This is carried by a top portion 703 of the power unit 720. The bottom portion 705 of the power unit 720 defines an interior battery compartment 707. Additionally, power unit 720 carries a coupling mechanism to allow coupling between the power unit 720 and an umbrella mast 719 at the upper end 711 of the mast 719, which preferably includes external threads 713. A top cap 715 is provided in the umbrella which connects the mast 719 and umbrella canopy 717. A feed wire 709 is provided between the power unit 720 and the electrical subassembly 750. Feed wire 709 passes through the hollow interior portion of mast 719. The cold cathode ray tube light subassembly 721 is coupled at a desired location within the umbrella in order to provide high intensity light under the umbrella. This will allow one to read, play games, or conduct other leisure activities that require a relatively high intensity light. The electrical components are entirely independent of any household electrical system. Rechargeable batteries are carried by the power unit to energize the cold cathode ray tube light subassembly 721. During daylight hours, light falling on solar panel 701 is utilized to recharge the rechargeable batteries that are maintained within battery compartment 707.

The cold cathode ray tube light subassembly 721 is described below in more detail in connection with FIGS. 13 and 14. As will be appreciated by those skilled in the art, other low power lighting systems can be used instead of a cold cathode ray tube subassembly 721. For example, an LED or fluorescent lighting system design can be used instead. LED and fluorescent systems designed for use with solar and low voltage lighting are known in the art. Such an alternative lighting source can be used with the present system in a manner which will be recognized by those skilled in the art. Implementation of LED, fluorescent, or other alternate light source in place of the described cold cathode ray tube light subassembly 721 is a straightforward implementation that need not be further described in detail.

FIG. 7 is a simplified depiction of a power unit 800 that is utilized to energize an electrical subassembly 850. As is shown, the power unit 800 is made up of a upper housing portion 803 and a lower housing portion 805. A solar panel 801 is preferably carried in upper portion 803. Lower housing portion 805 defines a battery compartment 807 that carries rechargeable batteries, preferably rechargeable nickel cadmium batteries. A feed wire 809 is provided between the power unit 800 and electrical subassembly 850. Feed wire 809 passes through a mast 819. The mast 819 includes an upper portion 811 that preferably carries external threads 813 that are adapted to engage an internally threaded port (not shown) carried by the lower portion 805 of power unit 800. A top cap 815 connects a canopy 817 to the mast 819. An electrical motor and fan 821 is located within a desired position under canopy 817 to provide a cooling breeze under the umbrella.

FIG. 8 depicts an alternative embodiment in which a power unit 900 is utilized to power an electrical subassembly 950. In this case, electrical subassembly 950 is a misting system. As is shown, the power unit 900 carries a solar panel 901 on an upper portion 903 of a housing. A lower portion 905 is provided that defines a battery compartment 907 for rechargeable batteries. A feed wire 909 connects the power unit 900 to the electrical subassembly 950. Feed wire 909 preferably passes through the inner bore of a mast 919. A top cap 915 connects a canopy 917 to the mast 919. The misting system 921 includes a misting nozzle 923 that is located in a desired position under canopy 917. A water feed line 929 is provided to move water, preferably chilled water, from a water container 925 to misting nozzle 923. The water is moved by the action of a pump 927.

FIG. 9 depicts yet another alternative embodiment of the power unit concept. As is shown, a power unit 1000 is utilized to provide electrical power to an electrical subassembly 1050. A top cap 1015 connects a canopy 1017 to a mast 1019. In this embodiment, electrical subassembly 1050 is an automatic opening and closing mechanism 1051 to open and close a canopy 1017. In this particular embodiment, the automatic closing system is carried at the uppermost portion of an umbrella mast 1019. Mechanism 1051 includes a motor 1021, a transmission 1023, and a line winding shaft 1025. These components cooperate to open and close the umbrella in response to the receipt of a command signal. The command signal may be supplied by the actuation of a switch carried on the umbrella, or it may be a wireless signal received from a paired transmitter receiver system. As in the other embodiments, power unit 1000 includes a solar panel 1001 which is carried at the upper portion 1003 of a housing. The lower portion 1003 of the housing defines a battery compartment 1007. The motor feed wire 1009 is passed from the power unit 1000 to the electrical subassembly 1050. The lower portion 1005 of the housing is adapted to engage the external threads 1013 of the upper portion 1011 of mast 1019.

Lawn Lighting Systems

FIGS. 10, 11 and 12 depict another utilization of a cold cathode ray tube in an outdoor lighting situation. This particular embodiment relates to lawn, landscape, or walkway lighting. FIG. 10 depicts one embodiment of a lawn lighting system. FIG. 11 depicts an exploded view of the lawn lighting system. FIG. 12 depicts an alternative embodiment of the lawn lighting system in which a central solar charging stand is utilized to provide charge to battery systems carried in a plurality of individual lights that are electrically connected together. In all of these embodiments, it will be appreciated that conventional photovoltaic cells may be conductively coupled to the rechargeable electrical power sources, preferably rechargeable batteries, to switch the light systems on and off depending on the amount of light hitting the photovoltaic cells. In addition, in all of these embodiments, solar energy systems are carried by the light housing members. The solar energy systems are adapted to collect solar energy and convert the solar energy into electrical energy. The solar energy systems are conductively coupled to the rechargeable electrical power sources, such that the solar energy collected and converted into electrical energy recharges the rechargeable electrical power sources.

FIG. 10 depicts lawn light 2011. Lawn light 2011 includes an upper light housing 2013 and a lower stake member 2015. The stake member includes a generally cylindrical and elongated body 2017 that terminates at a point 2019 which may be utilized to secure the light 2011 into the ground in a lawn, flowerbed, or along a walkway. It should be appreciated that stake member 2015 does not have to terminate at a point 2019; instead, stake member may terminate with a bracket member for attachment to certain structures, such as fences, decks, houses, or buildings. The upper light housing 2013 includes a translucent shroud 2021 that is generally cylindrical in shape. Three shade members 2023, 2025, and 2027 are provided to direct the light emitting from the light member 2011 downward to eliminate the lawn, landscaping, or walkway. A solar cell 2029 is provided at the upper portion of the light member 2011 to provide a trickle charge to rechargeable batteries 2031, 2033, 2035, and 2037.

FIG. 11 depicts light member 2011 in exploded view. As is shown, the stake member 2015 includes a hollow central cavity 2040 which is adapted to receive a plurality of batteries, preferably rechargeable batteries 2031, 2033, 2035, and 2037. An end cap 2041 is provided which may be open and closed to allow the placement and removal of batteries 2031, 2033, 2035, and 2037 within the cavity 2040. A spring 2043 is provided adjacent the end cap in order to make an electrical connection and to bias the batteries 2031, 2033, 2035, and 2037 into contact with one another and the lighting element, which will be discussed next. The use of cavity 2040 located in the stake member of light member 2011 to hold rechargeable batteries is unique in the lawn lighting field. This configuration allows the upper light housing 2013 to maintain a smaller shape, as the power source no longer has to be located in the upper light housing 2013. It should be understood that the size and shape of cavity 2040 may be altered to hold more or fewer rechargeable batteries, or to hold rechargeable batteries having different shapes.

As is shown, a cold cathode ray tube bulb 2053 is connected to a bulb housing 2052. The bulb housing 2052 carries threads or coupling members 2051 that allow for the releasable connection of bulb housing 2052 to the shroud 2021. This allows for the releasable mechanical connection between the shroud 2021 and the bulb housing 2052 to allow for the installation and/or replacement of bulb 2053. Positive and negative leads 2045 and 2047 are provided to complete the electrical connection between cold cathode ray tube bulb 2053, the batteries 2031, 2033, 2035, and 2037, and the solar cell 2029. In the preferred embodiment, an inverter is also required in this circuit, but is not depicted in this view. The inverter and the other electrical components will be discussed in detail below in an electrical schematic.

FIG. 12 depicts an alternative embodiment in this invention in which a remote solar cell panel 2071 is provided for energizing a plurality of lights such as lights 2081, 2083, 2085, and 2087. A conductor 2089 is connected to define a circuit between solar cell panel 2071 and the lights 2081, 2083, 2085, and 2087. Solar cell panel 2071 may be utilized as the sole means for recharging the rechargeable batteries 2093 carried by the lights 2081, 2083, 2085, and 2087, or it may be utilized to supplement the solar cells 2101, 2103, 2105, and 2107 carried on each of the individual lights 2081, 2083, 2085, and 2087. A control/regulation system 2090 may be provided in order to control the charging operation, and to convert DC current to AC current, which is necessary to power the cold cathode ray tube lights carried in each of the individual lights 2081, 2083, 2085, and 2087. The control/regulation system 2090 may also be carried within a stake 2091 that secures the solar cell panel 2071 in position optimize collection of solar energy. In accordance with the present invention, the electrical conductor 2089 may be buried in the ground so that it is not visible. Additionally, the conductor 2089 may be relatively long in length between the solar cell panel 2071 and the individual lights 2081, 2083, 2085, and 2087. This configuration allows the solar cell panel 2071 to be maintained in a location that is relatively hidden, as the solar cell panel 2071 may be considered by some to be unattractive. It will be appreciated that lights 2081, 2083, 2085, and 2087 and solar panel 2071 may also be electrically coupled to a separate solar energy system, such as a conventional solar heating system for a house or other building.

Cold Cathode Ray Tubes Utilized in Outdoor Lighting

FIGS. 13 and 14 depict one broad implementation of the present invention. The invention is to utilize in combination a cold cathode ray tube lamp, a power inverter that supplies alternating current to the cold cathode ray tube lamp, a rechargeable DC battery pack, and a solar panel. This is depicted in simplified form in FIG. 13. This may be utilized in any outdoor application in which there is no easy or convenient access to an AC power outlet. The unit is entirely self-contained and does not require any household power for operation, or charging. As is shown, an outdoor lighting system 3000 includes a cold cathode ray tube lamp 3001. Lamp 3001 is supplied with AC power from a power inverter 3007. A DC battery pack 3003 includes rechargeable batteries that supply DC current to power inverter 3007. A solar panel 3005 is provided to recharge the batteries contained within DC power pack 3003.

The cold cathode ray tube is a lamp that produces light by the passage of an electric current through a vapor or gas maintained within a tube. A cold cathode ray tube does not require any heating above ambient temperature to produce light. The tube is phosphor coated on its inner surface and thus may emit various colored light. In most cases, cold cathode ray tube lamps are low-pressure mercury vapor lamps. These lamps use a 253.7 nanometer ultraviolet emission from mercury vapor when excited by electrical discharge through the lamp to charge strong fluorescent in the phosphors maintained on the wall of the lamp.

The optimum operating temperature for cold cathode ray tubes is approximately 40° C., although it is believed that these lamps can be produced in a manner to reliably provide outdoor lighting in temperatures as cold as 15° F. While the cold cathode ray tube does not require heating, the output of the lamp does vary based upon the ambient temperature. At room temperature, the initial output of a lamp is only about 70% of its steady state value at 40° C. In contrast, its output is only about 25% when the lamp is started at 0° C. Cold starts do require additional voltage from the power source to ensure reliable operation. Cold cathode ray tubes may be utilized to supply a white light output.

One advantage of cold cathode ray tubes is that the tubes can be very thin in diameter. For example, in the preferred implementation, the cold cathode ray tube may be only one or two millimeters in diameter. In addition, cold cathode ray tubes can be bent into any shape and can be formed in very long lengths, such as several feet long.

One significant advantage of cold cathode ray tubes is that they have relatively long lamp life. It is not unusual to have lamp lives that are thirty to forty thousand hours of use. In other words, these cold cathode ray tubes have, for all practical purposes, an infinite life. Additionally, the number of lamp "starts" has no adverse effect on the lamp. This is not true for fluorescent lamps, which degrade over time due to the number of "starts." Additionally, cold cathode ray tubes provide greater light output per square foot versus conventional lighting.

In the preferred embodiment, a cold cathode ray tube lamp manufactured by Nanjing Lampus Electronics Company, Ltd. is used. Specifically, model CFL-20 is utilized. This model has an inner diameter of 1.5 millimeters. The tube length is variable, and may be anywhere in the range of 50 millimeters to 30 millimeters in overall length. The tube is adapted to operate on four milliamps of tube current. The tube voltage is in the range of 200 to 750 Volts. The average brightness of this particular tube is 40,000 cd/m$^2$.

As set forth above, cold cathode ray tubes have significant advantages. They are low power devices. They are low heat devices. They provide high lumen output. For these reasons, fewer batteries are needed to drive the cold cathode ray tube, and smaller solar cell panels may be utilized to recharge the batteries. In other words, relatively small form factors can be achieved because the solar cells, the batteries, and the bulbs can be relatively small in size.

The present invention can be implemented on a small, medium, or large scale so the solar cell panels and batteries may be moved up in size to either provide greater light output or to provide for a longer useful life. Additionally, the present invention may be considered to satisfy three separate and distinct outdoor lighting applications.

The first application is that of a "special purpose light," or "task light," such as for security applications. These special purpose lights would provide extremely high light output, for a relatively short duration. One example would be the utilization of the cold cathode ray tube to provide extremely high light output for a very small area for a very short time, all in response to detection of motion in a particular area. For example, a system can be configured to detect motion in a doorway, motion in a yard, motion in a driveway, or the like. A brightness can be provided that is far in excess of 40,000 cd/m$^2$. For example, 100,000 to 200,000 cd/m$^2$ may be provided for a very small area for a very short duration of time, such as from a few minutes to ten minutes.

Another application requires a medium amount of light output, but requires longer periods of operation or wider areas of coverage. For example, the light assembly provided with the umbrella provides a relatively high light output, such as in the range of 20,000 cd/m$^2$ to 100,000 cd/m$^2$ in order to allow one to read, play games, operate a computer, or do needlework under the umbrella. Preferably, the battery pack and associated solar panel is sufficient to allow the system to operate continuously for a time interval in the range of eight to twelve hours. Additionally, and preferably, the solar panel should be of a size and output that is sufficient to fully recharge the battery pack during the daylight hours.

A third application requires a lower level of light intensity. A good example would be lawn, patio, walkway, or landscape lighting. One does not ordinarily expect to be able to read or do intricate work under this type of lighting. In contrast, all that is expected is that a reasonable amount of light be provided to allow one to walk safely through an area. This type of task may require brightness in the range of 6,000 cd/m$^2$ to 60,000 cd/m$^2$.

FIG. 14 is a block diagram representation of the application of the present invention to a lawn lighting scenario. In this scenario, a plurality of solar panels 4001, 4003, 4005, and 4007 are connected together in series. Preferably, these are manufactured by Siemens and comprise mono-crystal solar panels. These each provide about 1.5 Volts. The total electrical current for the array of solar panels is about 80 milliamps. The current from the solar panels 4001, 4003, 4005, and 4007 is passed through a diode 4009 and then to a battery pack 4011. The battery pack includes one or more rechargeable batteries, preferably four AA-size 1.2-Volt Nickel Cadmium rechargeable batteries 4013, 4015, 4017, and 4018. Batteries 4013, 4015, 4017, and 4018 collectively provide about 700 milliamp hours of power.

The output of the DC battery pack 4011 is provided as an input to the inverter 4019. The inverter 4019 receives about 4.8 Volts DC as an input and produces about 800 Volts rms AC as an output. The frequency of the output is about 40 Hertz, and the total current of the output is about four to six milliamps. This output is provided to a cold cathode rat tube lamp 4021. The current passes through the vapor maintained within the tube and causes electrons to be stripped from the gas. These electrons collide with the phosphorus coating on the interior surface of the tube and emit light.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A light comprising:
  a light housing;
  a stake member coupled to the light h-ousting for supporting the light housing;

a cavity disposed within the stake member;

a rechargeable electrical power source disposed within the cavity;

a lighting element disposed within the light housing and being conductively coupled to the rechargeable electrical power source;

a solar energy system carried by the light housing, the solar energy system being adapted to collect solar energy and convert the solar energy into electrical energy, the solar energy system being conductively coupled to the rechargeable electrical power source, such that the solar energy collected and converted into electrical energy recharges the rechargeable electrical power source;

an additional solar energy system located remotely from the light housing, and not carried by the light housing or physically-integrated therewith, but being connected to said rechargeable electrical power source by an electrical cable, the additional solar energy system being adapted to collect solar energy and convert the solar energy into additional electrical energy, the additional solar energy system being conductively coupled to the rechargeable electrical power source, such that the additional solar energy collected and converted into electrical additional energy recharges the rechargeable electrical power source; and wherein said electrical cable is sufficiently long to permit said additional solar energy system to be located distally from said light housing in a different ambient light condition.

2. The light according to claim 1, wherein the rechargeable electrical power source is at least one rechargeable battery.

3. The light according to claim 1, wherein the stake member is releasably coupled to the light housing to provide access to the cavity.

4. The light according to claim 1, further comprising:
a spring disposed within the cavity for biasing the rechargeable electrical power source into conductive coupling with the cold cathode ray tube lighting element.

5. The light according to claim 1, further comprising:
a photovoltaic cell conductively coupled to the rechargeable electrical power source for switching the rechargeable electrical power source between on and off states depending upon the amount of light hitting the photovoltaic cell.

6. The light according to claim 1, further comprising:
a translucent shroud carried by the light housing for reflecting light generated by the lighting element.

7. The light according to claim 1, further comprising:
at least one shade member carried by the light housing for reflecting light generated by the lighting element.

8. The light according to claim 1, wherein the stake member terminates in a point to facilitate insertion into the ground.

9. The light according to claim 1, wherein the stake member terminates in a bracket member to facilitate connection to a structure.

10. A light comprising:
a light housing;
a stake member coupled to the light housing for supporting the light housing;
a rechargeable electrical power source disposed in at least one of said light housing and said stake member;
a lighting element disposed within the light housing and being conductively coupled to the rechargeable electrical power source;
a solar energy system carried by the light housing, the solar energy system being adapted to collect solar energy and convert the solar energy into electrical energy, the solar energy system being conductively coupled to the rechargeable electrical power source, such that the solar energy collected and converted into electrical energy recharges the rechargeable electrical power source;
an additional solar energy system located remotely from the light housing, and not carried by the light housing or physically-integrated therewith, but being connected to said rechargeable electrical power source by an electrical cable, the additional solar energy system being adapted to collect solar energy and convert the solar energy into additional electrical energy, the additional solar energy system being conductively coupled to the rechargeable electrical power source, such that the additional solar energy collected and converted into electrical additional energy recharges the rechargeable electrical power source; and
wherein said electrical cable is sufficiently long to permit said additional solar energy system to be located distally from said light housing in a different ambient light condition.

11. The light according to claim 10, wherein the rechargeable electrical power source is at least one rechargeable battery.

12. The light according to claim 10, wherein the stake member is releasably coupled to the light housing to provide access to the cavity.

13. The light according to claim 10, further comprising:
a cavity disposed within said stake member; and
a spring disposed within the cavity for biasing the rechargeable electrical power source into conductive coupling with the cold cathode ray tube lighting element.

14. The light according to claim 10, further comprising:
a photovoltaic cell conductively coupled to the rechargeable electrical power source for switching the rechargeable electrical power source between on and off states depending upon the amount of light hitting the photovoltaic cell.

15. The light according to claim 10, further comprising:
a translucent shroud carried by the light housing for reflecting light generated by the lighting element.

16. The light according to claim 10, further comprising:
at least one shade member carried by the light housing for reflecting light generated by the lighting element.

17. The light according to claim 10, wherein the stake member terminates in a point to facilitate insertion into the ground.

18. The light according to claim 10, wherein the stake member terminates in a bracket member to facilitate connection to a structure.

19. A light system comprising:
(a) a plurality of outdoor light members;
(b) wherein each of said plurality of outdoor light members is physically separate from one another;
(c) a conductor for electrically coupling together said outdoor light members;
(d) wherein said conductor includes multiple conductor segments, between particular ones of said plurality of outdoor light members, which are sufficiently long to separate said plurality of outdoor light members so that each of said plurality of outdoor light members lights a different location;
(e) wherein each outdoor light member includes:
  (1) a light housing;
  (2) a stake member coupled to the light housing for supporting the light housing;
  (3) a rechargeable electrical power source;
  (4) a lighting element disposed within the light housing and being conductively coupled to the rechargeable electrical power source;
(f) a solar energy system carried by the light housing, the solar energy system being adapted to collect solar energy and convert the solar energy into electrical energy, the solar energy system being conductively coupled to the rechargeable electrical power source, such that the solar energy collected and converted into electrical energy recharges the rechargeable electrical power source;
(g) an additional solar energy system located remotely from the plurality of outdoor light members, and not carried by the light housing or physically-integrated therewith, but being connected to said rechargeable electrical power source of each outdoor members by an electrical cable, the additional solar energy system being adapted to collect solar energy and convert the solar energy into additional electrical energy, the additional solar energy system being conductively coupled to the rechargeable electrical power source, such that the additional solar energy collected and converted into electrical additional energy recharges the rechargeable electrical power source; and
(h) wherein said electrical cable is sufficiently long to permit said additional solar energy system to be located distally from said plurality of outdoor light members in a different ambient light condition.

20. The light according to claim 19, wherein the rechargeable electrical power source is at least one rechargeable battery.

21. The light according to claim 19, wherein the stake member is releasably coupled to the light housing.

22. The light according to claim 19, further comprising:
a cavity disposed within said stake member;
a spring disposed within the cavity for biasing the rechargeable electrical power source into conductive coupling with the cold cathode ray tube lighting element.

23. The light according to claim 19, further comprising:
a photovoltaic cell conductively coupled to the rechargeable electrical power source for switching the rechargeable electrical power source between on and off states depending upon the amount of light hitting the photovoltaic cell.

24. The light according to claim 19, further comprising:
a translucent shroud carried by the light housing for reflecting light generated by the lighting element.

25. The light according to claim 19, further comprising:
at least one shade member carried by the light housing for reflecting light generated by the lighting element.

26. The light according to claim 19, wherein the stake member terminates in a point to facilitate insertion into the ground.

27. The light according to claim 19, wherein the stake member terminates in a bracket member to facilitate connection to a structure.

28. A light comprising:
a light housing;
a bracket coupled to the light housing for supporting the light housing;
a rechargeable electrical power source;
a lighting element disposed within the light housing and being conductively coupled to the rechargeable electrical power source;
a solar energy system carried by the light housing, the solar energy system being adapted to collect solar energy and convert the solar energy into electrical energy, the solar energy system being conductively coupled to the rechargeable electrical power source, such that the solar energy collected and converted into electrical energy recharges the rechargeable electrical power source;
an additional solar energy system located remotely from the light housing, and not carried by the light housing or physically-integrated therewith, but being connected to said rechargeable electrical power source by an electrical cable, the additional solar energy system being adapted to collect solar energy and convert the solar energy into additional electrical energy, the additional solar energy system being conductively coupled to the rechargeable electrical power source, such that the additional solar energy collected and converted into electrical additional energy recharges the rechargeable electrical power source; and
wherein said electrical cable is sufficiently long to permit said additional solar energy system to be located distally from said light housing in a different ambient light condition.

29. The light according to claim 28, wherein the rechargeable electrical power source is at least one rechargeable battery.

30. The light according to claim 28, wherein the bracket is releasably coupled to the light housing.

31. The light according to claim 28, further comprising:
a photovoltaic cell conductively coupled to the rechargeable electrical power source for switching the rechargeable electrical power source between on and off states depending upon the amount of light hitting the photovoltaic cell.

32. The light according to claim 28, further comprising:
a translucent shroud carried by the light housing for reflecting light generated by the cold cathode ray tube lighting element.

33. The light according to claim 28, further comprising:
at least one shade member carried by the light housing for reflecting light generated by the cold cathode ray tube lighting element.

* * * * *